United States Patent
Uchiyama et al.

(10) Patent No.: US 9,316,766 B2
(45) Date of Patent: Apr. 19, 2016

(54) OPTICAL FILTER, OPTICAL DEVICE, ELECTRONIC DEVICE AND ANTI-REFLECTION COMPOSITE

(75) Inventors: Masayuki Uchiyama, Saitama (JP); Michio Yanagi, Saitama (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 66 days.

(21) Appl. No.: 14/118,077

(22) PCT Filed: May 17, 2012

(86) PCT No.: PCT/JP2012/062663
§ 371 (c)(1),
(2), (4) Date: Nov. 15, 2013

(87) PCT Pub. No.: WO2012/157706
PCT Pub. Date: Nov. 22, 2012

(65) Prior Publication Data
US 2014/0085729 A1    Mar. 27, 2014

(30) Foreign Application Priority Data
May 17, 2011    (JP) .................... 2011-110634

(51) Int. Cl.
*G02B 27/00* (2006.01)
*G02B 1/118* (2015.01)

(52) U.S. Cl.
CPC ...................... *G02B 1/118* (2013.01)

(58) Field of Classification Search
USPC ................................. 359/601, 614
See application file for complete search history.

(56) References Cited

U.S. PATENT DOCUMENTS

| | | |
|---|---|---|
| 2006/0199040 A1 | 9/2006 | Yamada et al. |
| 2008/0176038 A1 | 7/2008 | Zhang et al. |
| 2009/0081361 A1 | 3/2009 | Yamada et al. |
| 2010/0112373 A1 | 5/2010 | Coffey et al. |
| 2011/0051250 A1 | 3/2011 | Fujita et al. |
| 2011/0117274 A1 | 5/2011 | Zhang et al. |

(Continued)

FOREIGN PATENT DOCUMENTS

| | | |
|---|---|---|
| CN | 101551475 A | 10/2009 |
| EP | 1 693 689 A1 | 8/2006 |

(Continued)

OTHER PUBLICATIONS

Jun. 19, 2012 International Search Report in International Patent Appln. No. PCT/JP2012/062663.

(Continued)

*Primary Examiner* — Jack Dinh
(74) *Attorney, Agent, or Firm* — Fitzpatrick, Cella, Harper & Scinto (57) ABSTRACT

There is provided an optical filter or an anti-reflection structure with lower reflection in comparison with the conventional ones by comprising a gradient refractive index thin film 12 with continuous, periodic refractive index change in the film thickness direction and a fine periodic structure 151 lowering reflection, wherein the refractive index of the gradient refractive index thin film 12 in its thickness direction on the substrate side changes so as to become close to that of the substrate, while on the fine periodic structure 111 changes so as to become close to that of the fine periodic structure 151. The optical filter can be used in an optical device or an electronic device display.

15 Claims, 9 Drawing Sheets

(56) References Cited

U.S. PATENT DOCUMENTS

| | | |
|---|---|---|
| 2011/0123777 A1 | 5/2011 | Imaoku et al. |
| 2014/0071552 A1 | 3/2014 | Uchiyama et al. |
| 2014/0133031 A1 | 5/2014 | Coffey et al. |

FOREIGN PATENT DOCUMENTS

| | | |
|---|---|---|
| EP | 1 947 486 A1 | 7/2008 |
| EP | 2 333 590 A1 | 6/2011 |
| EP | 2 711 744 A1 | 3/2014 |
| JP | 08-075902 A | 3/1996 |
| JP | 11-038201 A | 2/1999 |
| JP | 2002-267815 A | 9/2002 |
| JP | 2005-133131 A | 5/2005 |
| JP | 2009-122216 A | 6/2009 |
| JP | 2010-078803 A | 4/2010 |
| JP | 2011-048081 A | 3/2011 |
| JP | 2011-215440 A | 10/2011 |
| JP | 2013-015827 A | 1/2013 |
| WO | 2010/032610 A1 | 3/2010 |
| WO | 2010/042951 A2 | 4/2010 |
| WO | 2010/116728 A1 | 10/2010 |
| WO | 2010/150615 A1 | 12/2010 |

OTHER PUBLICATIONS

Oct. 1, 2014 Extended European Search Report in European Patent Appln. No. 12785564.1.

Jan. 19, 2015 Chinese Official Action in Chinese Patent Appln. No. 201280035598.7.

Oct. 28, 2014 Japanese Official Action in Japanese Patent Appln. No. 2013-515193 and partial translation thereof.

Oct. 23, 2015 Japanese Official Action in Japanese Patent Appln. No. 2013-515193.

OPTICAL FILTER, OPTICAL DEVICE, ELECTRONIC DEVICE AND ANTI-REFLECTION COMPOSITE

TECHNICAL FIELD

The present invention relates to an anti-reflection composite having a gradient refractive index thin film and a fine structure in this order on a light-transmitting substrate, an optical filter using the same, and an optical device and an electronic device using the same.

BACKGROUND ART

Many optical filters for use in various applications have problems caused by reflection of the filters themselves. For example, in some cases, an optical filter for use in an imaging optical system involves a phenomenon that part of light transmitted through the filter is reflected by another member and re-enters the optical filter from a light emitting surface of the optical filter. In such a case, if the optical filter has a reflectance in a wavelength region of the incident light, the light reflected by another member and re-entered is reflected again by the optical filter. As a result, a problem caused by the light reflected by the optical filter occurs. Therefore, further enhancement of the anti-reflection function of the optical filter has been strongly desired.

A light-absorbing-type optical filter including an absorbent structure, whose surface reflectance is made close to zero as far as possible, can also provide desired transmission characteristics by adjusting light-absorbing characteristics.

In general, as such an optical filter of the type having absorption in a desired wavelength region, an absorption-type ND (Neutral Density) filter for use in a light diaphragm device is widely known.

The light diaphragm is provided in an optical device to control the amount of light incident on a solid-state imaging element such as a silver halide film, or CCD and CMOS sensors. Some light diaphragms are structured so as to be narrowed to be smaller as the object field becomes brighter. When an object is photographed in the field of high brightness or in good weather, such structured light diaphragm enters a so-called small aperture state, which is susceptible to influence such as a diaphragm hunting phenomenon and a light diffraction phenomenon, which may cause deterioration in image performance.

As a countermeasure to this, it is devised that an ND filter is arranged near the aperture along an optical path through the diaphragm or an ND filter is directly attached to a diaphragm blade. The amount of light can be controlled in such an ND filter arrangement to increase the diaphragm aperture even if the object field has the same brightness.

With recent advances in sensitivity of the imaging element, improvements have been made to further reduce light transmittance by increasing the density of ND filters. As a result, the diaphragm aperture can be prevented from becoming too small, even if an imaging element with high sensitivity is used.

A transparent substrate made of glass or plastic material is used for the substrate for making the ND filter. Regarding the demands for machinability into any shape, reduction in size and weight in recent years, various plastic materials have come to be widely used as the substrate. Examples of the plastic materials for the substrate can include PET (polyethylene terephthalate), PEN (polyethylene naphthalate), PC (polycarbonate), PO (polyolefin). Regarding them, in particular, a norbornene-based resin and a polyimide-based resin as represented by Arton (product name, fabricated by JSR Co., Ltd.), Zeonex (product name, fabricated by Nippon Zeon Co., Ltd.) have been preferably used, from a comprehensive point of view including heat resistance and flexibility as well as a cost-related point of view.

Even in the ND filter, with respect to further high sensitivity, high resolution of the recent solid-state imaging element, there is an increasing possibility that a captured image has a problem such as ghost and flare caused by reflection of the filter itself as described above.

The following methods have been known for reflection reduction. First, JP 08-075902A (Patent Literature 1) proposes a method of suppressing the reflectance of any wavelength region, for example, by laminating several types of thin films each having the different refractive indexes and being made of different materials such as $SiO_2$, $MgF_2$, $Nb_2O_5$, $TiO_2$, $Ta_2O_5$, and $ZrO_2$ to form a multi-layer film-type anti-reflection film. In addition, JP 2009-122216A (Patent Literature 2) discloses an ND filter using a fine periodic structure as an anti-reflection structure.

REFERENCE LIST

Patent Literature

Patent Literature 1: JP08-075902A
Patent Literature 2: JP2009-122216A

SUMMARY OF INVENTION

Technical Problems to be Solved by the Invention

However, in a case of an anti-reflection film using a multi-layer film as disclosed in Patent Literature 1, in order to significantly reduce the reflectance over a wide wavelength region, only limited materials can be used as the thin film materials for making the multi-layer film. Therefore, such a structure requires a substantial number of layers or complicates the design.

When the anti-reflection structure of the ND filter has a fine periodic structure formed at a sub-micron pitch as disclosed in Patent Literature 2, it is relatively easier to expand the anti-reflection wavelength region and further easier to reduce the reflectance than the multi-layer film structure disclosed in Patent Literature 1. However, the structure to provide the fine structure on the substrate disclosed in Patent Literature 2 may cause a problem with light reflection at an interface thereof. In addition, for example, even in a light-absorbing layer made of a multi-layer thin film, it is extremely difficult to reduce the reflection of the overall filter close to zero as far as, by offsetting all light reflection occurring between structures of the filter only by interference effects.

It is an object of the present invention to provide an anti-reflection composite and an optical filter with the anti-reflection composite that reduces problems caused by reflectance of a light-absorbing optical filter as described above. It is another object of the present invention to provide an optical device and an electronic device using the optical filter which can reduce such reflectance.

Means for Solving the Problems

An optical filter according to the present invention is characterized in comprising:
a light-transmitting substrate,
a gradient refractive index thin film with refractive index change in the film thickness direction formed on the substrate, wherein a fine structure having many fine parts arranged at a pitch shorter than the wavelength of visible light is formed on the gradient refractive index thin film.

An optical device according to the present invention is characterized in using the optical filter having the above characteristic in an imaging optical system.

An electronic device according to the present invention is characterized in using the optical filter having the above characteristic in a display part.

An anti-reflection composite according to the present invention is characterized in comprising:

a gradient refractive index thin film with refractive index change in its thickness direction, an adhesive layer to stick a fine structure on the gradient refractive index thin film, wherein the fine structure comprising fine structural parts arranged at a pitch shorter than the wavelength of visible light are formed on the gradient refractive index thin film though the adhesive layer.

EFFECTS OF INVENTION

The present invention can provide an optical filter with markedly reduced reflection. The present invention can further provide an anti-reflection composite with markedly reduced reflection. When the optical filter is used in an imaging optical system, defects such as a ghost caused by reflection in the filter can be markedly reduced. In addition, when the optical filter is used in an imaging device, in particular its diaphragm device for light amount, a device can be obtained, which can solve defects such as image degradation caused by reflection.

DESCRIPTION OF EMBODIMENTS

The optical filter according to the present invention is assembled as a composite structure comprising a light-transmitting substrate, a gradient refractive index thin film and a fine structure. The anti-reflection composite according to the present invention is assembled as a composite structure comprising a gradient refractive index thin film and a fine structure.

The substrate used for the invention has strength and optical characteristics as the substrate, and can function as a base for forming the gradient refractive index thin film and the anti-reflection structure. The substrate can be made of a glass-based material or a resin material selected from PET (polyethylene terephthalate), PEN (polyethylene naphthalate), PES (polyether sulfone), PC (polycarbonate), PO (polyolefin), PI (polyimide), PMMA (polymethyl methacrylate).

In the case where an anti-reflection composite according to the present invention is formed on an optical filter, the optical filter per se is used as the substrate of the object to which the anti-reflection function is provided, and the optical filter with the anti-reflection structure according to the present invention can be also obtained by setting the gradient refractive index thin film and the anti-reflection structure on the surface of the optical filter to be treated for anti-reflection. The other substrate for the anti-reflection composite may be set on the surface of the optical filter to be treated for anti-reflection, if necessary, and the gradient refractive index thin film and the anti-reflection structure can be formed through the other substrate.

Alternatively, an anti-reflection structure according to the present invention may be formed on a substrate as an optical filter by adding the function of an optical filter to the substrate per se having the above anti-reflection composite.

On the other hand, as described later, the function as an optical filter can be added to the anti-reflection composite per se. In such a case, a substrate having strength and optical properties for a substrate of an optical filter can be selected.

A gradient refractive index thin film is set between a substrate and a fine structure. The gradient refractive index thin film may have a light-absorbing characteristic as an optical filter. In such a case, the light-absorbing property can be set depending on the desired functions and properties as an optical filter. The light-absorbing property of the gradient refractive index thin film may be set according to the functions and characteristics of the intended optical filter. If at least about 1% of incident light is absorbed with respect to a predetermined wavelength of the incident light, the film can be said to have a light-absorbing property with respect to the wavelength.

A gradient refractive index thin film, which has refractive index change in the film thickness direction, is formed on a substrate. An anti-reflection structure is formed on the gradient refractive index thin film which has refractive index change in the film thickness direction. As the anti-reflection structure, an anti-reflection structure having a surface where a large number of fine projections are arranged at a pitch shorter than the wavelength of visible light, or an anti-reflection structure having a surface where repeated recesses and projections are provided at a pitch shorter than the wavelength of visible light can be used. These fine structures includes a structure that reduces the refractive index difference between the structure and the air or the adjacent medium by means of randomly formed projections such as needle-like bodies and columnar bodies, and projected portions or recessed portions of a projection-recess structure finely formed in a staircase shape. These fine structures can be a fine structure selected from well-known fine structures according to the purpose. For example, the fine structure can be fabricated with good reproducibility using an optical nanoimprint method as long as the structure is a periodic structure made of a large number of projections arranged at a repetition period shorter than the wavelength of visible light transmitting the substrate or a fine periodic structure having a periodic structure made of a recess-projection structure at a repetition period shorter than the wavelength of visible light transmitting the substrate.

The gradient refractive index thin film has a refractive index change comprising a continuous and periodical change in a thickness direction thereof. This refractive index change preferably includes the following portions:
(1) a portion where, on the substrate side, the refractive index changes so as to be close to the refractive index of the substrate until the end point on the substrate side of the refractive index change; and
(2) a portion where, on the anti-reflection structure side, the refractive index changes so as to be close to the refractive index of the anti-reflection structure until the end point on the anti-reflection structure side of the refractive index change.

Figure 1:
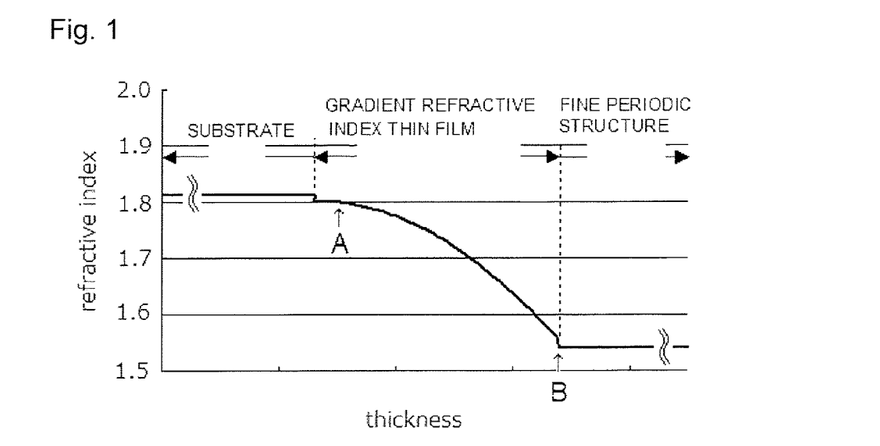
FIG. 1 illustrates an example of a refractive index distribution of a gradient refractive index thin film according to the present invention.

The above end point on the substrate side of the refractive index change is indicated, for example, by point "A" in FIG. 1, and the above end point on the anti-reflection fine periodic structure side is indicated by point "B". In the example illustrated in FIG. 1, the refractive index of the gradient refractive index thin film changes so as to be close to the refractive index of the substrate, in a terminal portion including end point (or start point) "A" on the substrate side of the refractive index distribution change. Likewise, in a terminal portion including end point (or start point) B on the anti-reflection structure side of the refractive index distribution change, the refractive index of the gradient refractive index thin film also changes so as to be close to the refractive index of the anti-reflection structure. Point A may be positioned on an interface on the substrate side. Point B may be also positioned on an interface on the anti-reflection structure side. If the change is continuous or the refractive index difference is small, the reflectance can be greatly reduced. Therefore, the refractive index can come close to the refractive index of an adjacent structure such as the substrate or the fine periodic structure, with smooth refractive index change from a larger refractive index thereof or from a smaller refractive index thereof. Sum (a+b) of difference "a" between the refractive index of the end portion on the substrate side in the film thickness direction of the gradient refractive index thin film and the refractive index of the substrate, and difference "b" between the refractive index of the end portion on the fine periodic structure side in the film thickness direction of the gradient refractive index thin film and the refractive index of the fine periodic structure may be smaller than the refractive index difference between these two structures adjacent to both surfaces of the gradient refractive index thin film.

In other words, the refractive index of the gradient refractive index thin film changes in the film thickness direction so as to reduce the difference between the refractive index of the substrate and the refractive index of the material of the fine structure, which satisfies the relation |A−B|>a+b, where |A−B| denotes a refractive index difference between refractive index "A" of the substrate and refractive index "B" of the fine periodic structure with respect to (a+b). This relation is applied to the substrates, the other gradient refractive index thin films, and the anti-reflection structures in FIG. 9 as described later.

Depending on the film forming method, an initial portion of the gradient refractive index thin film formed on the substrate may have a portion with a constant refractive index in the thickness direction. For example, as described later, when the gradient refractive index thin film is formed on the substrate, the mixing ratio of a plurality of thin film forming-materials is changed to form a continuous change of the refractive index in the film thickness direction. At this time, after a certain time has elapsed since the film formation started with a certain film forming-material concentration, the mixing ratio of the plurality of thin film forming-materials can be changed. In this case, a portion can be formed, without a change in refractive index in the thickness direction as described above.

The refractive index at the end point of the refractive index change on the substrate side is equal to the refractive index of the substrate or may be a refractive index in a range of the refractive index difference allowed according to the characteristics of the intended optical filter with respect to the refractive index of the substrate. Likewise the refractive index at the end point of the refractive index change on the anti-reflection structure side is equal to the refractive index of the anti-reflection structure or may be a refractive index in a range of the refractive index difference allowed according to the characteristics of the intended optical filter in a wavelength of the transmitted light or a wavelength region thereof with respect to the refractive index of the anti-reflection structure. These refractive index differences are preferably 0.05 or less. Thus, when a portion without a change in refractive index in the thickness direction as described above contacts an interface on the substrate side, the refractive index of the portion without a refractive index change preferably has a refractive index difference within 0.05 with respect to the refractive index of the substrate. This is also applied to the case where there is a portion without a change in refractive index in the thickness direction contacting an interface on the anti-reflection structure side.

The width of change in the refractive index in the thickness direction of the gradient refractive index thin film can be variously set depending on the characteristics of the intended optical filter, the type of material for forming the gradient refractive index thin film, and a combination thereof. For example, when the refractive index is changed from a region made of $SiO_2$ to a region made of $TiO_2$ using three kinds of elements in the thickness direction of the gradient refractive index thin film, the refractive index can be changed within a range of about 1.47 to 2.70.

Another anti-reflection structure can be formed on the substrate surface opposite the surface on which the gradient refractive index thin film and the fine structure are formed. The other anti-reflection structure may have an anti-reflection function required to obtain desired optical properties of an optical filter. As such another anti-reflection structure, a fine periodic structure having a recess-projection structure at a repetition period shorter than the wavelength of visible light transmitting the substrate, or an anti-reflection thin film in a form of a single layer or a plurality of layers can be used. In addition, a second gradient refractive index thin film can be set between the substrate and the anti-reflection structure on the back surface of the substrate.

The optical reflectance in the anti-reflection structure can be remarkably reduced by adjacently arranging the substrate, the gradient refractive index thin film where the refractive index continuously changes in the film thickness direction, and the anti-reflection structure exhibiting anti-reflection effects in a desired optical wavelength region, on the back surface of the substrate, in this order respectively. According to the present invention, the relationship of the substrate, the gradient refractive index thin film and the anti-reflection structure in respect to refractive index is set as described above in (1) and (2) using a thin film with the refractive index changing stepwise or continuously in the film thickness direction, preferably continuously and periodically.

The film thickness of the gradient refractive index thin film can be appropriately selected according to the intended function. The film thickness of the gradient refractive index thin film can be 10 to 4000 nm, and more preferably 100 to 1000 nm.

The anti-reflection structure according to the present invention is markedly useful for anti-reflection of various optical filters including ND filters to which the anti-reflection function is required.

The following embodiments can be used when an anti-reflection structure according to the present invention is applied to an optical filter:

(1) An optical filter with an anti-reflection structure can be prepared by setting a gradient refractive index thin film and a fine structure on the surface of the optical filter to be treated for anti-reflection so as to obtain the above structure to obtain an anti-reflection structure, wherein the surface of the optical filter to be treated is used as a substrate.

(2) An optical filter with an anti-reflection structure can be prepared by setting a substrate, a gradient refractive index thin film and a fine structure on the surface of the optical filter to be treated for anti-reflection so as to obtain the above structure to obtain an anti-reflection structure.

(3) An optical filter with an anti-reflection structure can be prepared by adding a function of an optical filter to at least one of a substrate, a gradient refractive index thin film and a fine structure according to the present invention.

Hereinafter, the optical filter according to the present invention will be described based on embodiments using an ND filter.

EXAMPLES

Example 1

Figure 2:
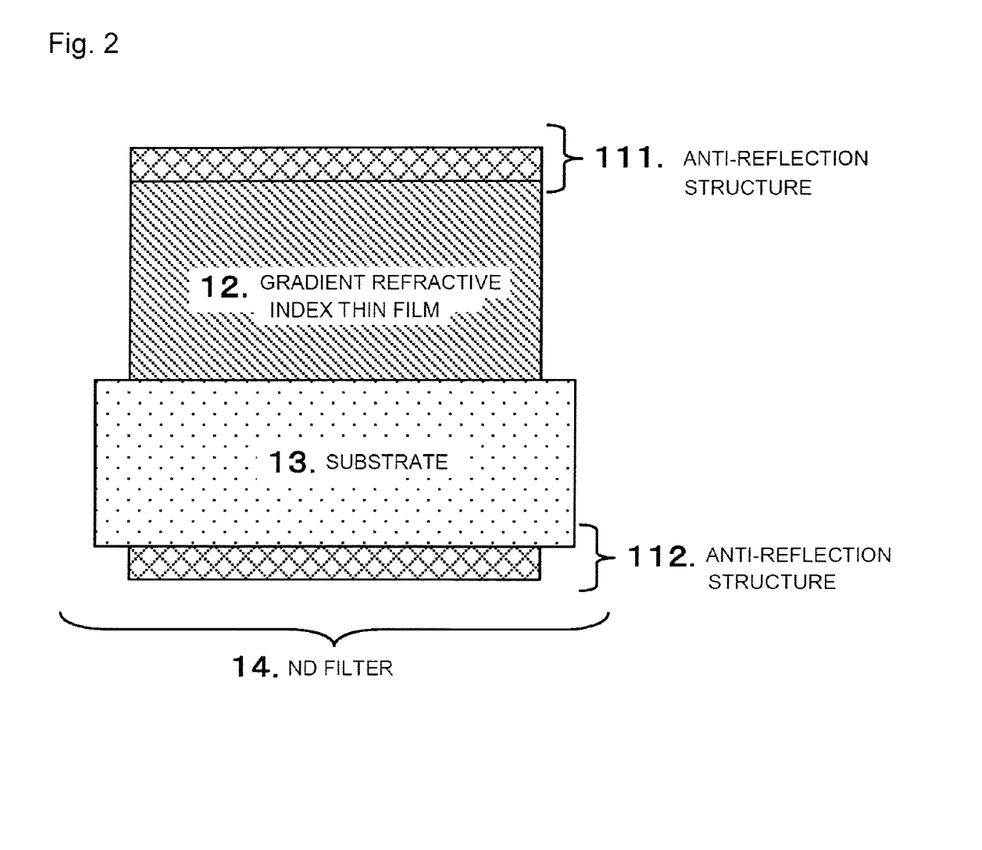
FIG. 2 is a drawing of a structure of an optical filter.

An absorption-type ND filter formed as illustrated in FIG. 2 will be described in detail as follows.

The refractive index for use in each example in the following description is identified as a refractive index of light with a wavelength of 540 nm from the materials of the substrate, the gradient refractive index thin film, and the anti-reflection structure.

The ND filter structures include that illustrated in FIG. 2. The ND filter as illustrated in FIG. 2 has the structure in which a gradient refractive index thin film 12 is arranged on one surface (upper surface) side of a substrate 13, and an anti-reflection structure 111 is arranged on the gradient refractive index thin film 12, and, then, an anti-reflection structure 112 is also arranged on the back surface of the substrate 13. In addition, at least an inner part of the gradient refractive index thin film 12 has absorption.

Figure 3:
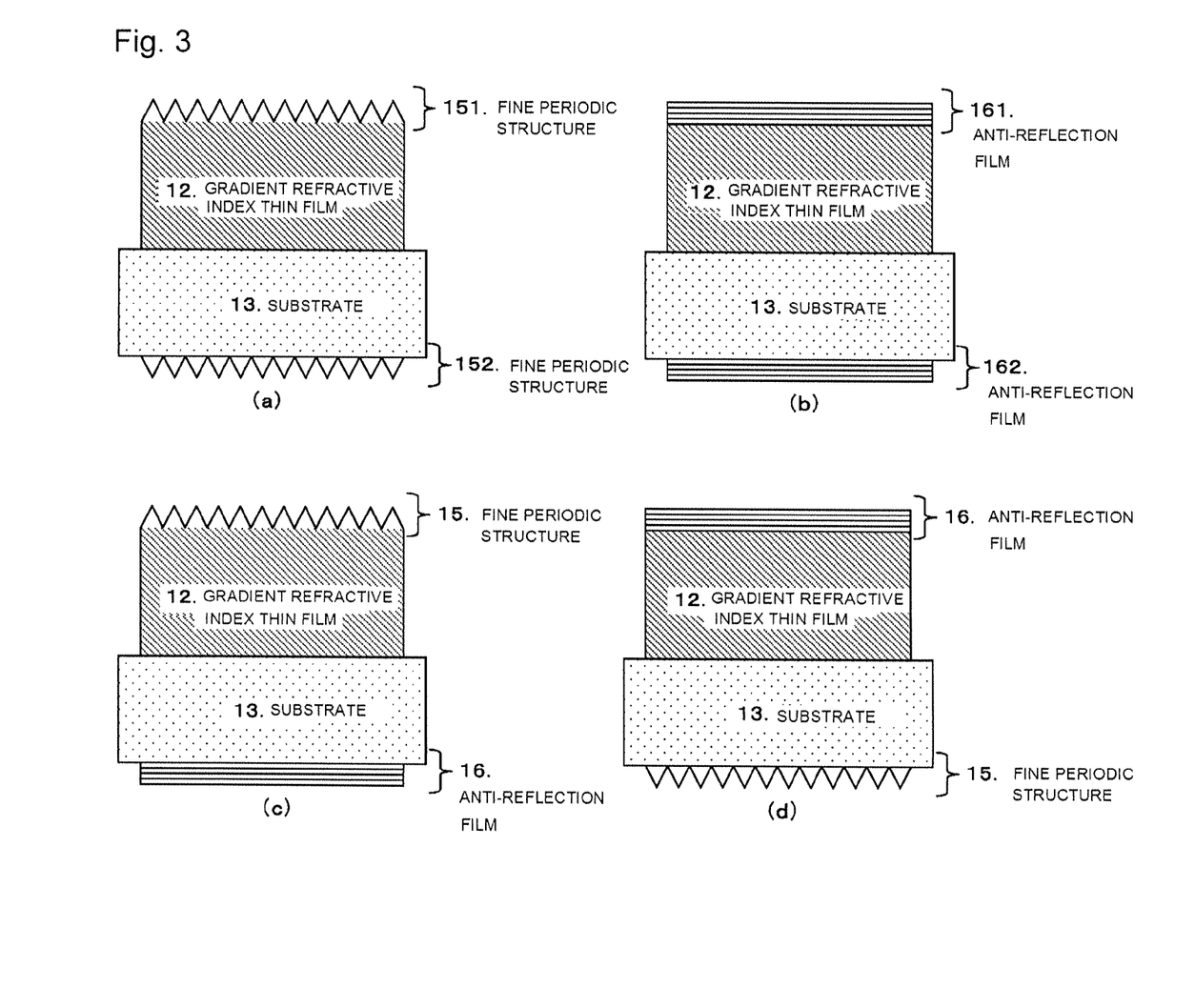
FIG. 3 illustrates a structural example of an optical filter.

In a case of the structure as illustrated in FIG. 2, the reflection on the opposite surface (lower surface) of the substrate will increase, and thus the lower surface may often require some kind of anti-reflection structure 112. As illustrated in FIGS. 3(a) and 3(b), examples of such anti-reflection structures 111 and 112 include the structures such as fine periodic structures 151 and 152 having anti-reflection effects and anti-reflection films 161 and 162 formed of a thin film of a single layer or a plurality of layers. Further, as illustrated in FIGS. 3(c) and 3(d), the examples thereof include a structure using a combination of the fine periodic structure 15 and the anti-reflection film 16. According to the present invention, the anti-reflection structure 111 on the gradient refractive index thin film is formed by a fine structure and the anti-reflection structure 112 is also arranged on the back surface of the substrate 13 as illustrated in FIGS. 3(a) and 3(c). Therefore, the structures in FIGS. 3(b) and 3(d) are shown as reference examples. Such a structure in FIG. 3(a) can suppress occurrence of ghost light due to filter reflection, for example, no matter which surface of the filter is oriented to the imaging element side. Therefore, the optical filter can be arranged in the optical system regardless of the direction of the filter.

Regarding FIGS. 3(a) and 3(c), the structure as illustrated in FIG. 3(a) is more preferable from the point of view of reduction in reflection. Thus, in the present example, the fine periodic structures 151 and 152 were formed on each surface of the substrate 13 as the anti-reflection structure as illustrated in FIG. 3(a).

A function providing the same effect as that of the anti-reflection films 161 and 162, which is formed as a multi-layer film as illustrated in FIG. 3(b), can be incorporated, for example, into the gradient refractive index thin film 12. In this case, a refractive index profile is required for preventing reflection at an interface with the outside air by increasing and decreasing the refractive index a plurality of times in a periodic and continuous manner in a predetermined region near the interface of the surface layer. Thus, the structure can be considered to separately provide an anti-reflection structure on the gradient refractive index thin film. When the anti-reflection film is fabricated, materials different from the materials used to fabricate the gradient refractive index thin film can be used to fabricate the anti-reflection film on the gradient refractive index thin film so as to change the refractive index in a periodic and continuous manner. Such formation embodiment of the anti-reflection film can be also applied to the similar structure parts in FIGS. 9 and 10 as described below.

A 0.1 mm-thick PET film was used for the substrate 13 for forming the ND filter 14 as described above so as to have a refractive index of about 1.60. In the present example, a PET film is used, but the material is not limited to this. A glass-based material may be used, or PO- or PI-based, PEN-, PES-, PC-, or PMMA-based resin materials may also be used.

<Regarding Gradient Refractive Index Thin Film>

The gradient refractive index thin film 12 was adjusted and fabricated by adjusting the film formation rate of $SiO_2$ and NbOx by meta-mode sputtering to combine these two materials, and continuously changing the refractive index in the film thickness direction so as to obtain desired absorbing characteristics.

<Sputtering Apparatus Structure>

Figure 4:
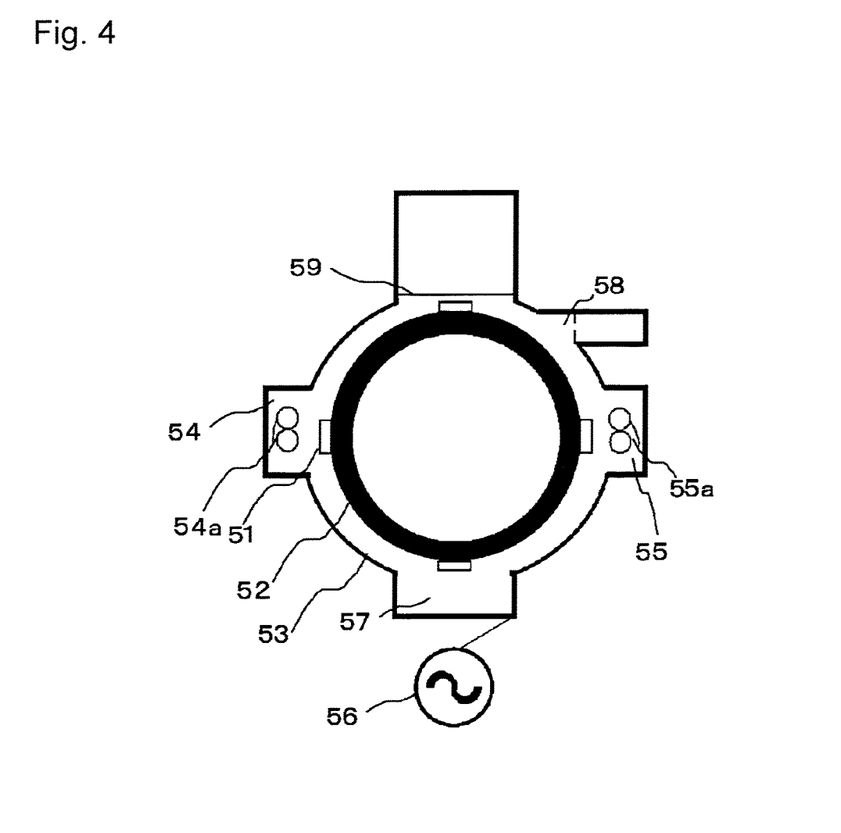
FIG. 4 is a schematic sectional view of a sputtering apparatus to producing an anti-reflection composite according to the present invention.

FIG. 4 is a cross-sectional plan view captured along the surface perpendicular to the rotating shaft of a substrate transfer apparatus of a sputter deposition apparatus used to fabricate the gradient refractive index thin film described in the present example.

A sputter deposition apparatus comprises a rotatable cylindrical substrate transfer apparatus 52 holding a substrate 51 on which a thin film is to be formed, the substrate transfer apparatus 52 being provided inside a vacuum chamber 53; two sputter regions 54 and 55 provided in an annular space between an outer peripheral portion of the substrate transfer apparatus 52 and the vacuum chamber 53 outside thereof; and a reaction region 57. The substrate is loaded from a region 59.

The substrate 51 was placed on the substrate transfer apparatus 52 so that the surface on which a film was to be formed was oriented outside. The sputter regions 54 and 55 include AC double (dual) cathode-type targets 54a and 55a. A high-frequency power source 56 is arranged outside the vacuum chamber 53. The shape of a target material is not limited to be of a flat type, but may be of a cylindrical type. In addition to the above, for example, the region 58 may separately include an ion gun grid by high-frequency excitation having a grid electrode, or a neutralizer that releases low-energy electrons to neutralize positive ions to prevent the positive ion charge accumulation on the substrate. The sputtering apparatus for use in the present invention may include, for example, three or more sputter regions and may be implemented by any apparatus structures other than the above apparatus.

Using the sputtering apparatus illustrated in FIG. 4 in the present example, the gradient refractive index thin film was formed in the form, in which a Si target was arranged in the sputter region 54; a Nb target was arranged in the sputter region 55; and oxygen was introduced in the reaction region 57. The substrate 51 fixed to the substrate transfer apparatus 52 was rotated at high speeds; Si and Ti ultra-thin films were formed on the substrate 51 in the sputter regions 54 and 55; and then the Si and Nb ultra-thin films were oxidized in the reaction region 57. Thus, the Si and Nb oxide films were formed. A mixed film of the Si oxide film and the Nb oxide film was fabricated by repeating the above process. Further, the gradient refractive index thin film having a continuous refractive index change in its film thickness direction was formed by continuously changing the sputter rate and the oxidation rate in each sputter region during film formation. A mixed film equivalent to $SiO_2$ and NbOx can also be fabricated by controlling the sputter rate and the oxidation rate of Si and Nb respectively based on film formation conditions independently for each of $SiO_2$ and NbOx. In a case in which the refractive index is continuously changed from the refractive index of the $SiO_2$ film alone to the refractive index of the NbOx film alone, when the input power is lowered, the electric discharge may be unstable. Thus, the input power was controlled and a masking system was used during oxidation rate control.

An example of such a gradient refractive index thin film having a continuous refractive index profile of is illustrated in FIG. 1. In FIG. 1, the substrate having a relatively high refractive index, the gradient refractive index thin film, and the fine periodic structure are laminated in this order. The refractive index changes so as to continuously increase or decrease the refractive index from the substrate side in the film thickness direction, and to be close to the refractive index of each adjacent structure as approaching an interface of both ends of the gradient refractive index thin film.

Figure 5:
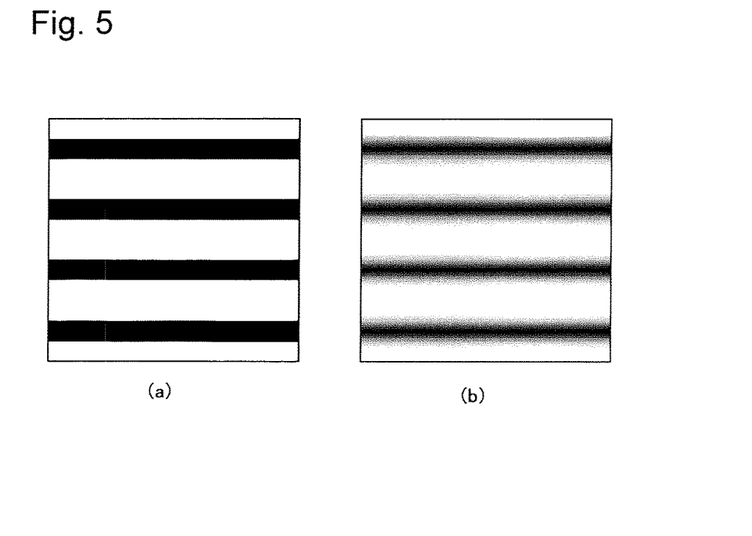
FIG. 5 illustrates electron micrographs of the multi-layer films and the gradient refractive index thin film.

The gradient refractive index thin film is a thin film where the refractive index changes continuously, preferably continuously and periodically, in a direction perpendicular to the film surface, namely, in the film thickness direction. The film having the continuous and periodical refractive index changes in the film thickness direction can be called a rugate film, or a rugate filter. FIG. 5 illustrates a schematic view of electron micrographs of the multi-layer film and the gradient refractive index thin film. FIG. 5(a) is a schematic cross-sectional view in the film thickness direction of the multi-layer film, and FIG. 5(b) is a schematic cross-sectional view in the film thickness direction of the gradient refractive index thin film. For example, it is assumed that the dark-colored portions are $SiO_2$ portions and the light-colored (white) portions are $Nb_2O_5$ portions, the multi-layer film is such that the film interface is clearly divided, while the gradient refractive index thin film is, unlike the multi-layer film, such that the film interface is not clearly divided. In addition, contrast is strong in the portions having a large refractive index change of the gradient refractive index thin film.

A plot of the results obtained by a depth direction analysis with density (strength) on the vertical axis and depth (parameter corresponding to the film thickness) on the horizontal axis is called a depth profile.

The depth direction analysis for studying composition distribution from the surface of a test sample to the inner side thereof often involves a method of analyzing by scraping the surface using accelerated ions for analysis in micron order or less. This method is referred to as ion sputtering, which is known as X-ray photoelectron spectroscopy (XPS) or Auger electron spectroscopy (AES or ESCA), and is often used to evaluate optical components, electronic components and functional materials having layered structures formed on the substrate surfaces.

These X-ray photoelectron spectroscopies emit X-rays to samples in ultra-high vacuum to detect electrons (photoelectrons) released. The released photoelectrons are caused by inner-shell electrons of atoms to be detected and the energy thereof is determined for each element. Thus, a qualitative analysis can be performed by knowing energy values. Thus, it is possible to confirm whether the desired refractive index distribution is obtained by evaluating the composition change in the film thickness direction of the gradient refractive index thin film to obtain a depth profile.

Various methods have been studied for designing such a gradient refractive index thin film. It has been found that even a step-type refractive index distribution with the refractive index changing stepwise and gradually, unlike the continuous change, can obtain substantially the same optical characteristics as the film having continuously changing index by adjusting the refractive index distribution. However, for reduction in reflection, continuous refractive index change can provide more ideal characteristics, which can further eliminate an interface in the thin film, and the front and rear film compositions are very close to each other, thus exhibiting the effects such as increase in film adhesion strength and improvement in environmental stability. From this point of view, it is better to select the refractive index distribution where the refractive index continuously changes.

Although the range of refractive index is limited, recent advancement in film formation technique such as sputtering and deposition allows any refractive index to be obtained within at least the range thereof. For example, two kinds of materials can be simultaneously electrically discharged in sputtering. A refractive index intermediate material having an intermediate refractive index between those of two materials can be fabricated by changing an electric discharge power of each material, namely, an input power to the targets and changing the mixture ratio thereof. Two or more kinds of materials may be mixed.

In the case of such sputtering, when one of the materials is low power, the electric discharge may be unstable. In the case of meta-mode sputtering, a reaction mode may occur. Thus, in order to achieve all refractive indexes between these two materials, it is necessary to control the film thickness in parallel by adjusting elements other than the input power, for example, by controlling the deposition amount by means of the mask method, which, however, greatly complicates the mechanism of the apparatus and the control thereof.

As noted above, in the meta-mode sputtering method, the refractive indexes were changed within a range in which the electric discharge can be stably maintained and controlled.

Although a profile having a plurality of peaks and bottoms can be formed, considering ease of control, the present profile was designed to be minimum required increase or decrease not to be complicated.

A refractive index difference is easy to occur in an interface between the substrate and the anti-reflection structure. From the point of view of anti-reflection, a film design was made so that the refractive index change was gradual in a region near the substrate and the anti-reflection structure. From the point of view of anti-reflection, it is preferable to design so as not to cause a refractive index difference as much as possible as illustrated by the schematic view in FIG. 1. However, in order to obtain a desired absorption, a high refractive index region is required. Thus, the gradient refractive index thin film is preferably such that the refractive index gradually increases from the vicinity of the substrate, passing through at least one inflection point, and gradually approaches the refractive index of the anti-reflection structure toward the anti-reflection structure.

Meanwhile, if there are different refractive indices not only in an interface between the substrate and the gradient refractive index thin film but also in an interface between the gradient refractive index thin film and the fine periodic structure, reflection occurs according to the refractive index difference. In light of this, if there a problem with reflection in these interfaces, the refractive index difference is preferably minimized as much as possible. In the present example, the rate ratio between $SiO_2$ and $NbOx$ was adjusted immediately after the start of film formation of the gradient refractive index thin film and just before the end of film formation thereof, thereby adjusting each refractive index difference at the two interfaces to be 0.05 or less. In addition, the gradient refractive index thin film 12 was adjusted to have a film thickness of 200 nm. The thinner the film thickness of the gradient refractive index thin film is, the steeper the rate of change in refractive index from the substrate to the anti-reflection structure is. Thus, from the point of view of anti-reflection, a thicker film is preferable. If there is a need to more reduce reflection, the need can be addressed by increasing the thickness up to about 400 nm.

<Regarding Anti-Reflection Structure>

The gradient refractive index thin film 12 was formed, and then the fine periodic structures 151 and 152 as a sub-micron pitch anti-reflection structure having anti-reflection effects were formed on the gradient refractive index thin film 12 by optical nanoimprint method using a UV curable resin.

With recent advancement in microfabrication technique, fine periodic structures have been fabricated.

The fine periodic structure having an anti-reflection effect as one of such structures can generally be called a Moth-Eye structure. The structure was shaped such that the refractive indices were continuously changed in a pseudo manner, thereby reducing reflection due to a refractive index difference between materials.

Figure 6:
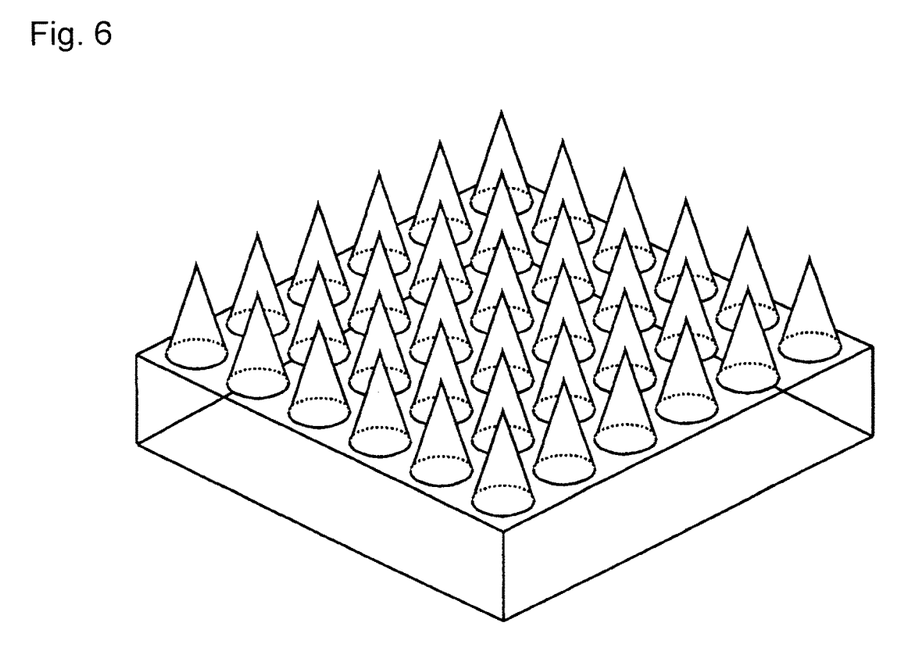
FIG. 6 illustrates a schematic view of a pillar array shaped fine periodic structure.

FIG. 6 illustrates a perspective view of a schematic example of the fine periodic structure as viewed from above, having an anti-reflection effect, on which cones are arranged in a pillar array shape on the substrate. Likewise, a fine periodic structure arranged in a hole array shape can also be formed. Such structure is often fabricated, for example, on a material surface, as a separate means from the anti-reflection film fabricated by laminating a thin film as a single layer or a plurality of layers by means of a vacuum film forming method.

Various methods have been proposed for fabricating such a fine periodic structure, but the present example used an optical nanoimprint method using a UV curable resin.

Figure 7:
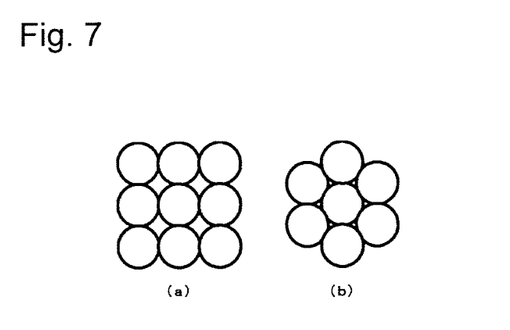
FIG. 7 illustrates an example of arrangement of fine structural parts

The fine periodic structure in the present example was designed to be shaped in a pillar array with periodically arranged cones as illustrated in FIG. 6, considering the applications of the ND filter, having a height of 350 nm and a period 250 nm so as to be a structure enabling reduction in reflectance of at least the visible wavelength region. Further, regarding the matrix-shaped array of protruding structures, there can be considered a square array as illustrated by the plan view of FIG. 7(a) and a three-way (hexagonal) array as illustrated by the plan view of FIG. 7(b). The three-way array is said to have a higher anti-reflection effect because of less exposed surface of the substrate material. Accordingly, the present example used the three-way pillar array.

An appropriate amount of UV curable resin was dropped on a quartz substrate as a mold having a hole array shape obtained by inverting the previously designed shape. Then, the resin was cured by emitting UV light to the substrate subjected to imprinting in a state of pressing the quartz mold thereto, thereby fabricating sub-micron pitch pillar array shaped fine periodic structures 151 and 152. Although various UV curable resins can be used, here PAK-01 (trade name; fabricated by Toyo Gosei Co., Ltd.) having refractive index adjusted to 1.50 after polymerization curing was used.

Here, in order to increase adhesion between the gradient refractive index thin film and the fine periodic structure, primer treatment was performed to provide an adhesion layer between the gradient refractive index thin film and the fine periodic structure. As a primer solution, surfactant KBM-503 (trade name) fabricated by Shin-Etsu Chemical Co., Ltd., was used as a base, to which an appropriate amount of IPA (isopropyl alcohol) and nitric acid was added, and then an adjustment was made so that the adhesion layer cured after coating had a refractive index of 1.45. The solution was dropped on the gradient refractive index thin film through a 0.2 μm-PTFE (polytetrafluoroethylene) filter, and was coated so as to form an ultra-thin film by spin coating. Thereafter, the adhesion layer was formed by drying at 120° C. for 10 minutes. If there is a need to further strengthen the adhesion, TEOS (tetraethylorthosilicate) may be further added to the component of the aforementioned primer solution. In addition, in order to more uniformly coat the primer solution, before coating the primer solution, hydrophilic processing by UV ozone is more preferably performed on the substrate. Further, in order to coat both surfaces of the substrate, the concentration may be appropriately adjusted and coated by dip coating; or after one side thereof may coated by spin coating, then the front and back of the substrate are reversed, and then the other side surface thereof may be coated again by spin coating. In the present example, the latter was selected. The refractive index difference between the adhesion layer and the adjacent structure is preferably within 0.05.

In the case of a filter having absorption over an entire visible wavelength region like the ND filter, the ultraviolet region also often has absorption. Therefore, depending on the wavelength of UV light to be used, when light is emitted from the substrate side of the filter, the ND filter absorbs at least part of the light, and thus sufficient light may not reach the resin. Thus, in that case, there is a need to emit UV light from the mold side and to select a mold having a material allowing the required wavelength of UV light to be sufficiently transmitted.

Further, considering the optical nanoimprint process, when one side surface of the substrate 13 is subjected to imprinting, and then the other side surface thereof is subjected to imprinting, it is assumed to result in damages such as cracking or chipping in the initially formed fine periodic structure. In light of this, there was selected a method of arranging imprint molds on each surface of the substrate and simultaneously performing optical nanoimprint on both surfaces thereof. In this case, productivity can be increased by arranging two UV light sources for each surface of the substrate.

<Optical Filter Characteristics>

Figure 8:
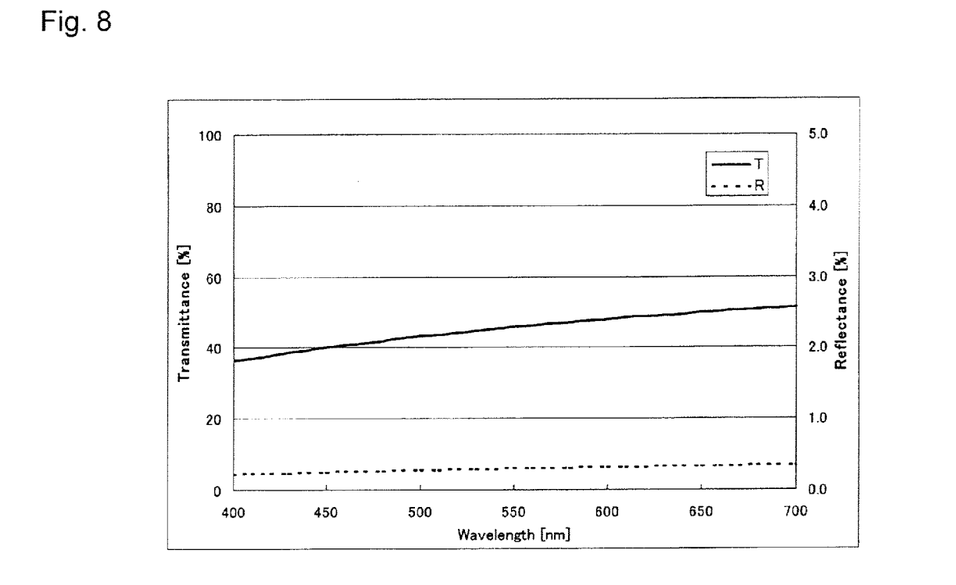
FIG. 8 illustrates spectral reflectance characteristics of the optical filter fabricated in Example 1.

FIG. 8 illustrates the spectral reflectance characteristics and the spectral transmittance characteristics of the ND filter fabricated as described above. The density is about 0.35 to about 0.50 and the reflectance in the visible wavelength region is 0.4% or less. The present structure achieved a very low reflectance. Spectrophotometer (U4100) fabricated by Hitachi High-Technologies Corporation was used for measurement.

A higher density thin film can be stably formed by a sputtering method than by a deposition method or other methods.

In the present example, oxides were used for controlling the refractive index, but nitride may also be used, and various compounds may be used as long as the refractive index changes continuously and periodically as the gradient refractive index thin film.

Adhesion and durability can be improved by providing a buffer layer between the substrate and the fine periodic structure. In this case, a design considering the buffer layer may be made. The refractive index of the buffer layer is set to be the same as that of the adjacent substrate or the anti-reflection structure, or the refractive index difference is set to be minimized, and the refractive index difference is preferably set to be 0.05 or less.

Examples of the adhesion layer forming materials when the adhesion layer is provided as the buffer layer include not only a silane coupling agent but also inorganic materials such as Cr, Ti, TiOx, TiNx, SiOx, SiNx, AlOx, and SiOxNy and various organic materials. Any adhesion layer forming material can be appropriately selected and used from well-known materials according to the material of the layer for increasing adhesion. The film thickness of the adhesion layer may be set so as to obtain the intended optical function and adhesion of the filter. The adhesion layer may be formed, for example, as a thin film of 10 nm or less.

Example 2

Figure 9:
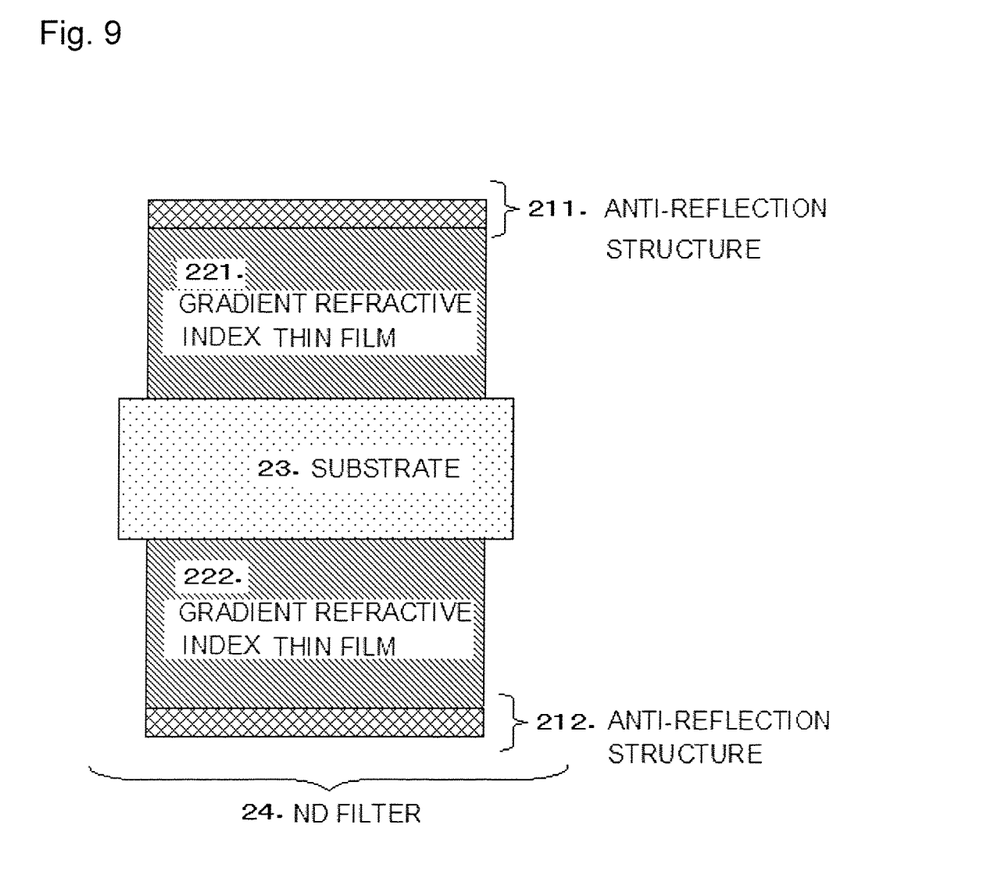
FIG. 9 is a drawing of a structure of an optical filter.
Figure 10:
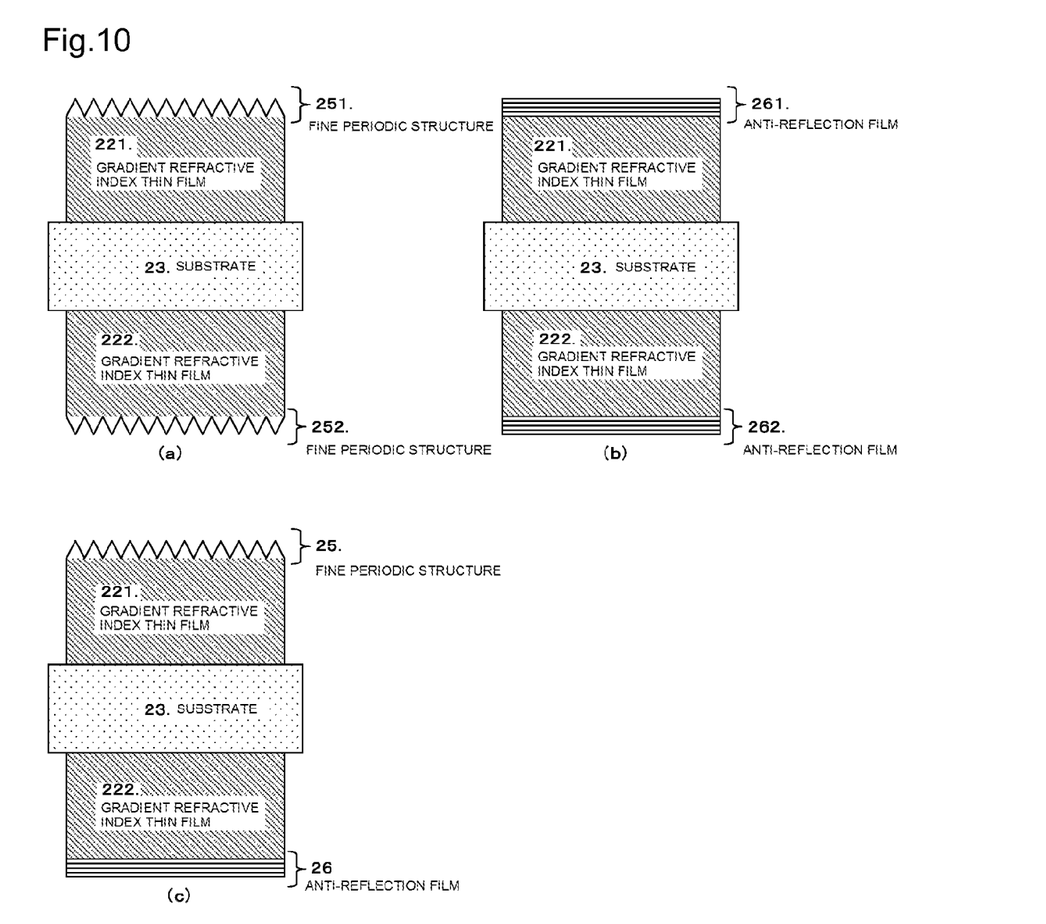
FIG. 10 illustrates an example of a structural example of an optical filter.

There follows a description of fabrication of a filter forming gradient refractive index thin films on each surface of the substrate as illustrated in FIG. 9.

The other structures of a ND filter include that shown in FIG. 9. In the ND filter shown in FIG. 9, a gradient refractive index thin film 221 was arranged on one side surface (front surface) of a substrate 23. Then, after an anti-reflection structure 211 was arranged on the gradient refractive index thin film 221, a gradient refractive index thin film 222 (as the other gradient refractive index thin film) and an anti-reflection structure 212 were arranged on the back surface of the substrate 23. Both gradient refractive index thin films 221 and 222 provided a function having a desired absorption in a desired wavelength region of the ND filter 24. Under certain circumstances, only one or the other of the gradient refractive index thin films 221 and 222 can provide the similar characteristics. Examples of such anti-reflection structures 211 and 212 can include fine periodic structures 251 and 252 having an anti-reflection effect; and anti-reflection films 261 and 262 formed of a thin film of a single layer or a plurality of layers. In addition, the examples thereof can include a structure of combining a fine periodic structure 25 and an anti-reflection film 26 as illustrated in FIG. 10(c).

In the present invention, the structures shown in FIGS. 10(a) and 10(c) are adopted. Therefore, the structure shown in FIG. 10(b) is a reference example. Regarding the structures shown in FIGS. 10(a) and 10(c), the structure as shown in FIG. 10(a) is more desired in respect to reflection reduction. Therefore, fine periodic structures 251 and 252 as the anti-reflection structure were formed both sides of the substrate 23.

SFL-6 glass with refraction index of 1.81 and a thickness of 1.0 mm was used for the substrate 23 for forming the ND filter 24.

In the same manner as in Example 1, first the gradient refractive index thin film 221 was fabricated on one side of the substrate 23 by meta-mode sputtering, while adjusting the film formation rate of the $SiO_2$ and TiOx films for mixing them to change refractive index in the film thickness direction. Thereafter, the front and back of the substrate were reversed, and then the gradient refractive index thin film 222 as a mixed film of $SiO_2$ and TiOx was fabricated again in the same manner. The film thickness of the gradient refractive index thin films 221 and 222 was adjusted to be 200 nm.

In addition, a film design was made such that the absorbing characteristics of the gradient refractive index thin films 221 and 222 were adjusted by not only continuously changing the refractive index in the film thickness direction but also changing X of TiOx in the film thickness direction and changing the extinction coefficients. The gradient refractive index thin films 221 was formed so as to include $TiO_3$ in a large amount and so that the spectral transmission characteristics in a visible wavelength region was increased toward the long wavelength, while the gradient refractive index thin films 222 was formed so as to include TiO in a large amount and so that the spectral transmission characteristics in a visible wavelength region was lowered toward the long wavelength. Thus, the spectral transmission characteristics in a visible wavelength region of 400 nm to 700 nm were set to be flat characteristics with small dispersion as the total of the gradient refractive index thin films on the both sides of the substrate.

Using the sputtering apparatus illustrated in FIG. 4, the gradient refractive index thin film was formed in the form, in which a Si target was arranged in the sputter region 54; a Ti target was arranged in the sputter region 55; and oxygen was introduced in the reaction region 57. The substrate 51 fixed to the substrate transfer apparatus 52 was rotated at high speeds; Si and Ti ultra-thin films were formed on the substrate 51 in the sputter regions 54 and 55; and then the Si and Ti ultra-thin films were oxidized in the reaction region 57. Thus, the Si and Ti oxide films were formed. A mixed film of the Si oxide film and the Ti oxide film was fabricated by repeating the above process. Further, the gradient refractive index thin film having a continuous refractive index change in its film thickness direction was formed by continuously changing the sputter rate and the oxidation rate in each sputter region during film formation. A mixed film equivalent to $SiO_2$ and TiOx can also be fabricated by controlling the sputter rate and the oxidation rate of Si and Ti respectively based on film formation conditions independently for each of $SiO_2$ and TiOx. In a case in which the refractive index is continuously changed from the refractive index of the $SiO_2$ film alone to the refractive index of the TiOx film alone, when the input power is lowered, the electric discharge may be unstable. Thus, the input power was controlled and a masking system was used during oxidation rate control.

Thereafter, the fine periodic structures 251, 252 as a submicron pitch anti-reflection structure by an optical nanoimprint process, nanoimprint lithography, using a ultra violet (UV)-curable resin. A mold was set on each substrate surface to which the ND film was formed for the same reason in Example 1 and the optical nanoimprint process was carried out simultaneously on both surfaces. The primer treatment was carried out as Example 1 to improve the adherence between the gradient refractive index thin film and the fine periodic structure to form an adherence layer between them.

Figure 11:
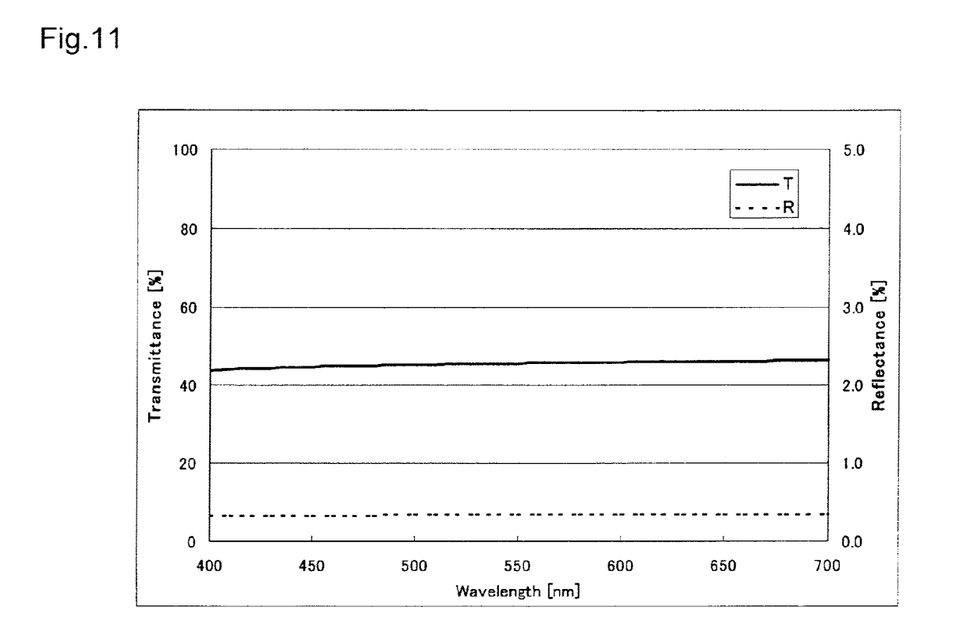
FIG. 11 illustrates spectral reflectance characteristics of the ND filter fabricated in Example 2.

FIG. 11 illustrates the spectral reflectance characteristics and the spectral transmittance characteristics of the ND filter fabricated as described above. The density is about 0.30 to 0.35 and the reflectance in the visible wavelength region is 0.4% or less. The present structure achieved a very low reflectance. Spectrophotometer (U4100) fabricated by Hitachi High-Technologies Corporation was used for measurement.

As described above, a method of producing an anti-reflection structure can be used for production of the anti-reflection structure according to the present invention, which is characterized in comprising:

forming a gradient refractive index thin film on a substrate, forming an anti-reflection structure on the gradient refractive index thin film, wherein the gradient refractive index thin film is formed by continuously changing refractive index in the film thickness direction according to change mixing ratio of the materials using a film formation process with two or more materials for forming the gradient refractive index thin film.

Various sputtering methods and various deposition methods may be used for the film formation process. In particular, a meta-mode sputtering method can be preferably used. In Examples 1 to 2, a mixed film between $SiO_2$ and NbOx or TiOx was fabricated by meta-mode sputtering, and a gradient thin film having a continuous refractive index was formed by changing the mixing ratio in the film thickness direction. Without being limited to this, various metal or metalloid oxide materials such as TaOx, ZrOx, AlOx, MoSiOx, MoOx, and WOx can be used. From the relation to the refractive index of the structure forming the interface with the aforementioned gradient refractive index thin film, considering the constraints on the process, any optimal material may be appropriately selected as long as the material can achieve the required refractive index. Materials including three or more kinds of metal or metalloid elements may be combined. The refractive index can be stably tilted by combining three or more kinds of materials, which facilitates adjustment of extinction coefficients such as reduction in absorption, thereby increasing freedom of design. At this time, not only oxide but also nitride can increase freedom of design as well.

Further, when reactive deposition is used, the gradient thin film can be formed by controlling the introduced gas and controlling the refractive index and the extinction coefficient. The structure may be such that part of the gradient thin film in the film thickness direction has absorption, or the refractive index is continuously changed while having absorption on the whole. The film forming method is not limited to only the meta-mode sputtering method, but other sputtering methods and various deposition methods may be used.

The gradient refractive index thin film formed according to the present example becomes a high density film and may cause a problem with film stress. In this case, like the present example, the use of a substrate such as glass with high rigidity can reduce problems such as warping due to film stress. Alternatively, the use of gradient refractive index thin films on each surface of the substrate can cancel film stress with each other, thereby producing stable optical filters. In particular, the structure of providing the gradient refractive index thin film and the fine periodic structure on both surfaces of the substrate used in the present example can provide stability of the substrate to the film stress. In addition, both surfaces of the fine periodic structure can be subjected to optical nanoimprint to form the anti-reflection structure by a series of continuous or simultaneous process, which is excellent in productivity.

A buffer layer can be formed at least one position selected from those (a) between the substrate and the gradient refractive index thin film, (b) between the gradient refractive index thin film and the fine periodic structure, and (c) between the gradient refractive index thin film and the anti-reflection structure to improve adhesion and durability. In this case, a design considering the buffer layer may be made. The refractive index of the buffer layer is set to be the same as that of the adjacent substrate or the fine periodic structure, or their refractive index difference is set to be minimized, and the refractive index difference is preferably set to be 0.05 or less.

Examples of the adhesion layer forming materials when the adhesion layer is provided as the buffer layer include not only a silane coupling agent but also inorganic materials such as Cr, Ti, TiOx, TiNx, SiOx, SiNx, AlOx, and SiOxNy and various organic materials. Any adhesion layer forming material can be appropriately selected and used from well-known materials according to the material of the layer for increasing adhesion. The film thickness of the adhesion layer may be set so as to obtain the intended optical function and adhesion of the filter. The adhesion layer may be formed, for example, as a thin film of 10 nm or less.

Example 3

Figure 12:
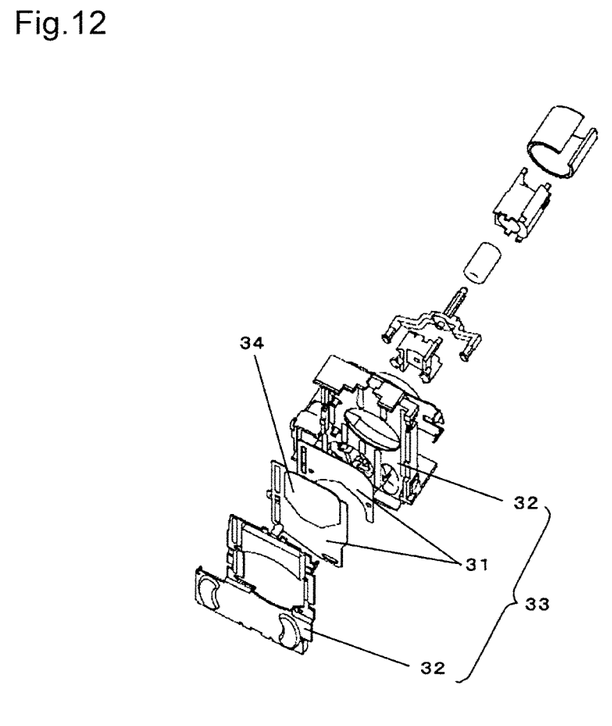
FIG. 12 illustrates an explanatory drawing of a light diaphragm device in Example 3.

FIG. 12 illustrates a light diaphragm device. The aperture of the light diaphragm device suitable for use in an imaging optical system such as a video camera or a digital still camera is provided to control the amount of light incident on a solid-state imaging element such as a CCD or CMOS sensor. The light diaphragm device is structured so as to be narrowed to be smaller by controlling diaphragm blades 31 as the object field becomes brighter. At this time, as a countermeasure to degradation of image quality which occurs in a state of small aperture state, an ND filter 34 is arranged near the aperture, thereby allowing the aperture of the diaphragm to be larger even if the brightness of the object field is the same. Incident light passes through the light diaphragm device 33, and reaches the solid-state imaging element (unillustrated), in which the light is converted into an electrical signal to form an image.

The ND filter fabricated in Examples 1 and 2 is arranged, for example, in a position of an ND filter 34 inside the diaphragm device 33. However, arrangement location is not limited to this, but the ND filter can be arranged so as to be fixed to a diaphragm blade supporting plate 32.

The light diaphragm device 33 fabricated in the above-described manner can remarkably reduce problems such as ghost caused by filter reflection.

Without being limited to the above cases, even in the other optical apparatuses, problems with the apparatus caused by filter reflection can be solved by using the optical filter with reduced reflectance as fabricated by Examples 1 and 2.

Other Examples

Optical filters other than the ND filter described in Examples 1 and 2 can also be expected to have similar effects. For example, these optical filters can be applied to an anti-reflection protective film or an anti-reflection protector to reduce reflection in the desired wavelength such as a filter to protect an object such an imaging device or a poster to be protected. When the optical filter is used for a protective plate of a touch-panel, an electronic device can be provided in which visibility of the display can be improved. When the optical filter has light adsorption, the optical filter can be applied to a color filter, an IR cut-off a fluorescent filter, a various band filter, an edge filter. Reflection can be reduced by applying the optical filer according to the present invention. Various optical devices can be provided by loading these optical filters, in which the problems as described above can be improved.

Reference Signs List

111, 112, 211, 212: Anti-reflection structure

12, 221, 222: Gradient refractive index thin film 13, 23: Substrate
15, 151, 152, 251, 252: Fine periodic structure
16, 161, 162: Anti-reflection film
31: Diaphragm blade
32: Diaphragm blade supporting plate
33: Light diaphragm device
34: ND filter

The invention claimed is:

1. An optical filter comprising:
a light-transmitting and transparent substrate serving as (a) a part of the optical filter and (b) a target for film forming,
a gradient refractive index thin film with refractive index change in the film thickness direction formed on the substrate; and
a fine structure having a pitch shorter than the wavelength of visible light formed on the gradient refractive index thin film,
wherein the fine structure is formed by a material having a refractive index different from the refractive index of the substrate,
wherein the gradient refractive index thin film is formed by a film having no interface, which film is formed by a plurality of film-forming materials, the mixing ratio of which is changed in the film thickness direction, and
wherein the refractive index change is continuous in the film thickness direction, on the substrate side, so as to be close to the refractive index of the substrate, and, on the fine structure side, so as to be close to the refractive index of the fine structure.

2. The optical filter according to claim 1, wherein the gradient refractive index thin film has the refractive index change in the film thickness direction so as to reduce a refractive index difference between the refractive index of the substrate and the refractive index of the fine structure.

3. The optical filter according to claim 2, wherein the refractive index change in the film thickness direction satisfies the following relation:

$$|A-B|>a+b$$

wherein
A is the refractive index of the substrate,
B is the refractive index of the material forming the fine structure,
a is a difference between the refractive index of the end portion of the gradient refractive index thin film on the substrate side, and the refractive index of the substrate, and
b is a difference between the refractive index of the end portion of the gradient refractive index thin film on the fine structure side, and the refractive index of the fine structure.

4. The optical filter according to claim 1, wherein an anti-reflection structure is formed on the surface of the substrate opposite the surface on which the fine structure is formed.

5. The optical filter according to claim 4, wherein the anti-reflection structure has fine structures arranged at a pitch shorter than the wavelength of visible light.

6. The optical filter according to claim 1, wherein another gradient refractive index thin film having a refractive index change in the film thickness direction is formed on the surface of the substrate opposite the surface on which the fine structure is formed so as to reduce a refractive index difference between the refractive index of the substrate and the refractive index of an anti-reflection structure, and
wherein the anti-reflection structure is formed on the another gradient refractive index thin film.

7. The optical filter according to claim 1, wherein the gradient refractive index thin film is composed of three or more elements.

8. The optical filter according to claim 1, wherein the refractive index difference between an end point of the refractive index change on the substrate side of the gradient refractive index thin film and the substrate is less than 0.05.

9. The optical filter according to claim 1, wherein the fine structure has a periodic structure having a pitch shorter than a wavelength of visible light.

10. An optical apparatus using the optical filter according to claim 1 in an imaging optical system.

11. An electronic device using the optical filter according to claim 1 in a display part.

12. An anti-reflection composite comprising:
a gradient refractive index thin film with refractive index change in its thickness direction formed on a light-transmitting and transparent substrate, the substrate serving as (a) a part of an optical filter and (b) a target for film forming;
an adhesive layer to stick fine structural parts on the gradient refractive index thin film; and
fine structural parts arranged at a pitch shorter than the wavelength of visible light, the fine structural parts being formed on the gradient refractive index thin film through the adhesive layer,
wherein the gradient refractive index thin film is formed by a film having no interface, which film is formed by a plurality of film-forming materials, the mixing ratio of which is changed in the film thickness direction, and
wherein the refractive index change is continuous in the film thickness direction, on the substrate side, so as to be close to the refractive index of the substrate and, on the fine structural parts side, so as to be close to the refractive index of the fine structural parts.

13. The anti-reflection composite according to claim 12, wherein each of (a) the refractive index difference between the refractive index of the adhesive layer and the refractive index of the material of the fine structural parts, and (b) the refractive index difference between the refractive index of the adhesive layer and the refractive index of the part of the gradient refractive index thin film on the side adjacent to the adhesive layer is less than 0.05.

14. The anti-reflection composite according to claim 12, wherein the substrate is a light-transmitting substrate, and
wherein the gradient refractive index thin film has the refractive index change in the film thickness direction so as to reduce a refractive index difference between the refractive index of the substrate and the refractive index of the fine structural parts.

15. The anti-reflection composite according to claim 14, wherein the refractive index change in the film thickness direction satisfies the following relation:

$$|A-B|>a+b$$

wherein
A is the refractive index of the substrate;
B is the refractive index of the material forming the fine structural parts;
a is a difference between the refractive index of the end portion of the gradient refractive index thin film on the substrate side, and the refractive index of the substrate; and
b is a difference between the refractive index of the end portion of the gradient refractive index thin film on the fine structural parts side, and the refractive index of the fine structural parts.

* * * * *